United States Patent
Elbatt et al.

(10) Patent No.: US 7,420,954 B2
(45) Date of Patent: Sep. 2, 2008

(54) EFFICIENT LIGHTWEIGHT INFORMATION DISSEMINATION ALGORITHM FOR MOBILE WIRELESS AD HOC NETWORKS

(75) Inventors: Tamer A. Elbatt, Woodland Hills, CA (US); Timothy D. Andersen, San Diego, CA (US)

(73) Assignee: General Motors Corporation, Detroit, MI (US)

( * ) Notice: Subject to any disclaimer, the term of this patent is extended or adjusted under 35 U.S.C. 154(b) by 714 days.

(21) Appl. No.: 10/756,942

(22) Filed: Jan. 13, 2004

(65) Prior Publication Data

US 2005/0152318 A1    Jul. 14, 2005

(51) Int. Cl.
- H04Q 7/24 (2006.01)
- H04L 12/28 (2006.01)
- H04B 7/14 (2006.01)
- H04B 7/00 (2006.01)

(52) U.S. Cl. .................. 370/338; 370/254; 370/255; 370/315; 455/41.2

(58) Field of Classification Search ............. 455/41.2, 455/507; 370/236, 400, 238, 409, 392, 315–327, 370/338, 254, 255; 375/132, 133
See application file for complete search history.

(56) References Cited

U.S. PATENT DOCUMENTS

| | | | |
|---|---|---|---|
| 6,990,075 B2 * | 1/2006 | Krishnamurthy et al. | 370/236 |
| 7,006,453 B1 * | 2/2006 | Ahmed et al. | 370/255 |
| 7,113,746 B2 * | 9/2006 | Payton et al. | 455/41.2 |
| 7,177,295 B1 * | 2/2007 | Sholander et al. | 370/338 |
| 2001/0033548 A1 * | 10/2001 | Saleh et al. | 370/218 |
| 2004/0192331 A1 * | 9/2004 | Gorday et al. | 455/456.1 |
| 2004/0203380 A1 * | 10/2004 | Hamdi et al. | 455/41.2 |
| 2004/0233918 A1 * | 11/2004 | Larsson et al. | 370/400 |
| 2004/0246901 A1 * | 12/2004 | Zhang et al. | 370/238 |
| 2005/0063318 A1 * | 3/2005 | Xu et al. | 370/254 |
| 2005/0117535 A1 * | 6/2005 | Mahonen | 370/328 |

OTHER PUBLICATIONS

Martin Mauve and Jorg Widmer, *A Survey on Position-Based Routing in Mobile Ad Hoc Networks*, IEEE Network, Nov./Dec. 2001, pp. 30-39.

Elizabeth M. Royer, "*A Review of Current Routing Protocols for Ad Hoc Mobile Wireless Networks*", IEEE Personal Communicatin, Apr. 1999, pp. 46-55.

(Continued)

*Primary Examiner*—George Eng
*Assistant Examiner*—Nam Huynh

(57) ABSTRACT

A system and method for information dissemination in a wireless mobile ad hoc network. A method describes receiving a request to communicate a message from a source node to a destination, identifying each neighbor node of an ad hoc network, invoking a proactive border node broadcast protocol at the source node when the destination is a neighbor node and wherein the number of hops to the destination is less than a predetermined number of hops, invoking an on-demand border node broadcast protocol at the source node when the number of hops from the source node to the destination exceeds the predetermined number, and communicating the message from the source node based on the invoked broadcast protocol. A computer readable medium containing a computer program for information dissemination in a wireless mobile ad hoc network is also provided. Finally, a system for information dissemination in a wireless mobile ad hoc network is described.

14 Claims, 4 Drawing Sheets

OTHER PUBLICATIONS

Min-te Sun, et al., "*GPS-Based Message Broadcasting for Inter-vehicle Communication*", 2000 IEEE, pp. 279-286.

Rahul Jain, et al., "*Geographical Routing Using Partial Information for Wireless Ad Hoc Networks*", IEEE Personal Communications, Feb. 2001, pp. 48-57.

Stefano Basagni, et al, Center for Advanced Communications Systems and Services (CATSS), "*Mobility-Independent Flooding for Real-Time Multimedia Applications in Ad Hoc Networks*", pp. 1-5.

Lachlan B. Michael, et al., Dept. of Electrical Engineering, Keio University, "*Multi-Hop for Inter-Vehicle Communication over Multiple Lanes*", pp. 1-5.

Linda Briesemeister, et al., DaimlerChrysler AG, Research and Technology, Gunter Hommel, Technical University of berlin, Department of Computer Science, "*Disseminating Messages among Highly Mobile Hosts based on Inter-Vehicle Communication*", Proceedings of the IEEE Intelligent Vehicles Symposium 2000, Dearborn, (MI), USA, Oct. 3-5, 2000, pp. 522-527.

Zygmunt J. Haas, et al., "*Ad Hoc Mobility Management with Uniform Quorum System,*", IEEE/ACM Transactions on Networking, vol. 7, No. 2, Apr. 1999, pp. 228-240.

Zong Da Chen, et al., Harvard University, "*Ad Hoc Relay Wireless Networks over Moving Vehicles on Highways*", pp. 1-4.

Jingyang Li, et al., M.I.T. Laboratory for Computer Science, "*A Scalable Location Service for Geographic Ad Hoc Routing*", pp. 1-11.

Josh Broch, et al., Computer Science Department, Carnegie Mellon University, http://www.monarch.cs.cmu.edu/, "*A Performance Comparison of Multi-Hop Wireless Ad Hoc Network routing Protocols*", To appear in Proceedings of the Fourth Annual ACM/IEEE International Conference on Mobile Computing and Networking (Mobi Com '98), Oct. 25-30, 1998, Dallas, Texas, USA. Copyright©1998 ACM, pp. 1-13.

* cited by examiner

EFFICIENT LIGHTWEIGHT INFORMATION DISSEMINATION ALGORITHM FOR MOBILE WIRELESS AD HOC NETWORKS

FIELD OF THE INVENTION

The invention relates to wireless networks, and more particularly to methods and systems for efficient information dissemination within wireless mobile ad hoc networks.

BACKGROUND OF THE INVENTION

Many passenger vehicles now incorporate an integrated communication system. A Vehicle Communication Unit (VCU) used in conjunction with a Wide Area Network (WAN) such as a cellular telephone network or a satellite communication system allows for a variety of fee-based subscription services to be provided in a mobile environment. The VCU is typically a vehicle telematics device including a cellular radio, satellite transceiver, a wireless access point transceiver adhering to IEEE 802.11 or similar wireless communication standards, and global positioning capabilities. Communication through a carrier service may be initiated at the VCU at turn-on or through manual or voice command phone number entry. A radio communication link is established between the VCU and a node of a wireless LAN or WAN in the vicinity of the VCU to provide an additional communications channel through a wireless mobile ad hoc network (MANET).

A wireless mobile ad hoc network provides communication through a dynamic network formed of wireless access point nodes within radio transmission range of one another. The mobile wireless access point nodes exchange information among each other (e.g. location, velocity, etc.) to route information, such as data packets, within the ad hoc network. An information dissemination algorithm provides a communication protocol for information exchange within the MANET. A wireless access point node seeking to disseminate information (e.g. position information) to another wireless access point node invokes the information dissemination algorithm to facilitate communication between the nodes.

There are generally two routing paradigms for mobile ad hoc networks: topology-based and position-based. Topology-based routing protocols use information about the links that form the network (connectivity) to forward a packet from a source node to a destination node. The topology-based routing protocols can be further classified into proactive and on-demand. On-demand routing protocols are favorable in MANETs due to their low overhead compared to proactive (table-driven) counterparts, since multi-hop routes must be discovered and maintained only when needed. This advantage comes at the expense of the latency incurred in the initial route setup (discovery) phase.

The operation of topology-based on-demand protocols starts with a route discovery phase in which a source node sends a route request (RR) message throughout the ad hoc network in order to establish a route to a destination node. Once the destination node receives the RR, it replies with a route confirm (RC) message through the discovered route. Most on-demand routing protocol proposals rely on flooding algorithms for RR dissemination. Flooding in an ad hoc network comprises broadcasting a communication to every node in the vicinity of the originating node. Afterwards, each node that successfully receives the broadcast packet re-broadcasts it to its respective neighbors. This process is repeated until the entire network is covered.

By contrast, position-based routing protocols depend solely on the physical location of the participating nodes, which alleviates some of the limitations of topology-based routing. A position based routing protocol instructs a node to forward a data packet to the neighbor closest to the destination without defining a complete path to the destination, i.e. the routing decisions are taken on a hop-by-hop basis. The main advantage is that it eliminates any delay incurred by the route discovery phase, since the packet forwarding decision is based solely on position information. In addition, any impact on the routing decision resulting from the mobility of intermediate nodes is largely reduced, since the routing decision does not depend on topology and is taken on a hop-by-hop basis. However, this advantage is gained at the expense of separate information dissemination algorithms that serve as the infrastructure for distributing location information among all nodes in the network. The above discussion illustrates that information dissemination is a fundamental element of the two main classes of routing protocols in MANETs, namely on-demand topology-based and position-based routing.

In MANETs, we introduce a metric of information dissemination performance known as "reachability", which is defined as the percentage of times a node of interest is successfully located within the ad hoc network. Another MANET performance metric is delay, which is defined as the time incurred to locate a node. Other performance metrics include communication overhead (the total number of transmissions needed to achieve the dissemination task) and storage overhead (the average number of table entries per access point node).

One example of information dissemination, referred to above, is flooding. Flooding is very simple, however, it achieves very low reachability due to the so-called "broadcast storm problem". The broadcast storm problem arises when all neighbors of a given node, say A, re-broadcast a packet sent by A. This, in turn, causes an excessive number of collisions at the multiple access control (MAC) layer. In addition, flooding-based algorithms are highly inefficient since they waste the system's bandwidth and energy resources unnecessarily. Presently known information dissemination algorithms for mobile ad hoc networks introduced in the literature are primarily based on flooding. Examples of flooding include Ad hoc on Demand Vector (AODV) and Dynamic Source Routing (DSR) techniques as described by E. Royer and C-K Toh, ("A Review of Current Routing Protocols for Ad-Hoc Mobile Wireless Networks," IEEE Personal Communications Magazine, pp. 46-55, April 1999), and other protocols described by M. Mauve, J. Widmer and H. Hartenstein, ("A Survey on Position-based Routing in Mobile Ad Hoc Networks," IEEE Network, pp. 30-39, November/December 2001). As discussed previously, flooding is highly inefficient due to the broadcast storm problem, as reported by J. Broch, et al., ("A Performance Comparison of Multi-hop Wireless Ad-hoc Networking Routing Protocols," ACM MOBICOM, October 1998). In addition, flooding wastes system bandwidth and energy resources unnecessarily, such as, for instance, the so called "DREAM" system which uses table-based flooding for information dissemination (S. Basagni et al., "A Distance Routing Effect Algorithm for Mobility (DREAM)," ACM MOBICOM 1998). Thus, in the DREAM system proposal, each node would have to keep the information (e.g. position) of every other node in the network. It is evident that this approach is not scalable, and furthermore would be infeasible in an embedded system environment due to the large table data storage requirements.

In another proposal by Z. Haas and B. Liang, ("Ad Hoc Mobility Management with Uniform Quorum Systems,"

IEEE/ACM Transactions on Networking, Vol.7, No.2, pp. 228-240, April 1999), the authors propose a quorum-based location service for ad hoc networks. Under this proposal, a subset of mobile nodes (that constitute a "virtual backbone") are chosen to keep the position information of all other nodes. Although this protocol proposal could potentially reduce the dissemination overhead, a considerable amount of control overhead would be incurred in creating and maintaining the virtual backbone under mobility conditions.

Another article by J. Li et al., ("A Scalable Location Service for Geographic Ad Hoc Routing," ACM MOBICOM 2000), proposes a hierarchical Grid location service. However, its applicability to the car-to-car networks environment is questionable due to the limited processing and storage constraints enforced by the embedded system implementation.

An article by M. Sun, et al., ("GPS-Based Message Broadcasting for Inter-vehicle Communication," IEEE International Conference on Parallel Processing, 2000), describes the idea of border node (selective) flooding. The essence of the proposed algorithm is to select a number of neighbors, to re-broadcast a message, based on the neighbors' location relative to the sender. However, the algorithm proposed by M. Sun, et al., has two major limitations. First, it is not scalable since, for large networks, each vehicle would have to keep a huge table carrying the position information of all other vehicles; second, it is not optimized for arbitrary roadmaps with multiple intersecting roads. These limitations constitute major hurdles towards the utility and feasibility of the algorithm proposed by M. Sun, et al. in a car-to-car networks environment.

Presently known and proposed information dissemination algorithms lack scalability for dynamically changing node density, such as when node density cycles between many nodes and few nodes in a given time period. Furthermore, known algorithms are not optimized for arbitrary node location and consume memory resources that exceed the practical limitations of many embedded system designs. It is desirable, therefore, to provide a system and method for information dissemination in an ad hoc mobile network that overcomes these and other disadvantages.

SUMMARY OF THE INVENTION

The present invention is directed to a method for information dissemination in wireless mobile ad hoc networks. The method describes receiving a request to communicate a message from a source node to a destination, identifying each neighbor node of an ad hoc network, invoking a proactive border node broadcast protocol at the source node when the destination is a neighbor node and wherein the number of hops to the destination is less than a predetermined number of hops, invoking an on-demand border node broadcast protocol at the source node when the number of hops from the source node to the destination exceeds the predetermined number, and communicating the message from the source node based on the invoked broadcast protocol.

In accordance with another aspect of the invention, a system for information dissemination in a wireless mobile ad hoc network is provided. The system describes means for determining a request to communicate a message from a source node to a destination node, means for identifying each neighbor node of an ad hoc, means for invoking a proactive border node broadcast protocol at the source node when the destination is a neighbor node and wherein the number of hops to the destination is less than a predetermined number of hops, means for invoking an on-demand border node broadcast protocol at the source node when the number of hops from the source node to the destination exceeds the predetermined number and means for communicating the message from the source node based on the invoked broadcast protocol.

In accordance with yet another aspect of the invention, a computer readable medium is provided. The computer readable medium includes computer readable code for determining a request to communicate a message between a source node and a destination, computer readable code for identifying each neighbor node of an ad hoc, computer readable code for invoking a proactive border node broadcast protocol at the source node when the destination is a neighbor node and wherein the number of hops to the destination is less than a predetermined number of hops, computer readable code for invoking an on-demand border node broadcast protocol at the source node when the number of hops from the source node to the destination exceeds the predetermined number, and computer readable code for directing the communication of the message from the source node based on the invoked broadcast protocol.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Figure 1:
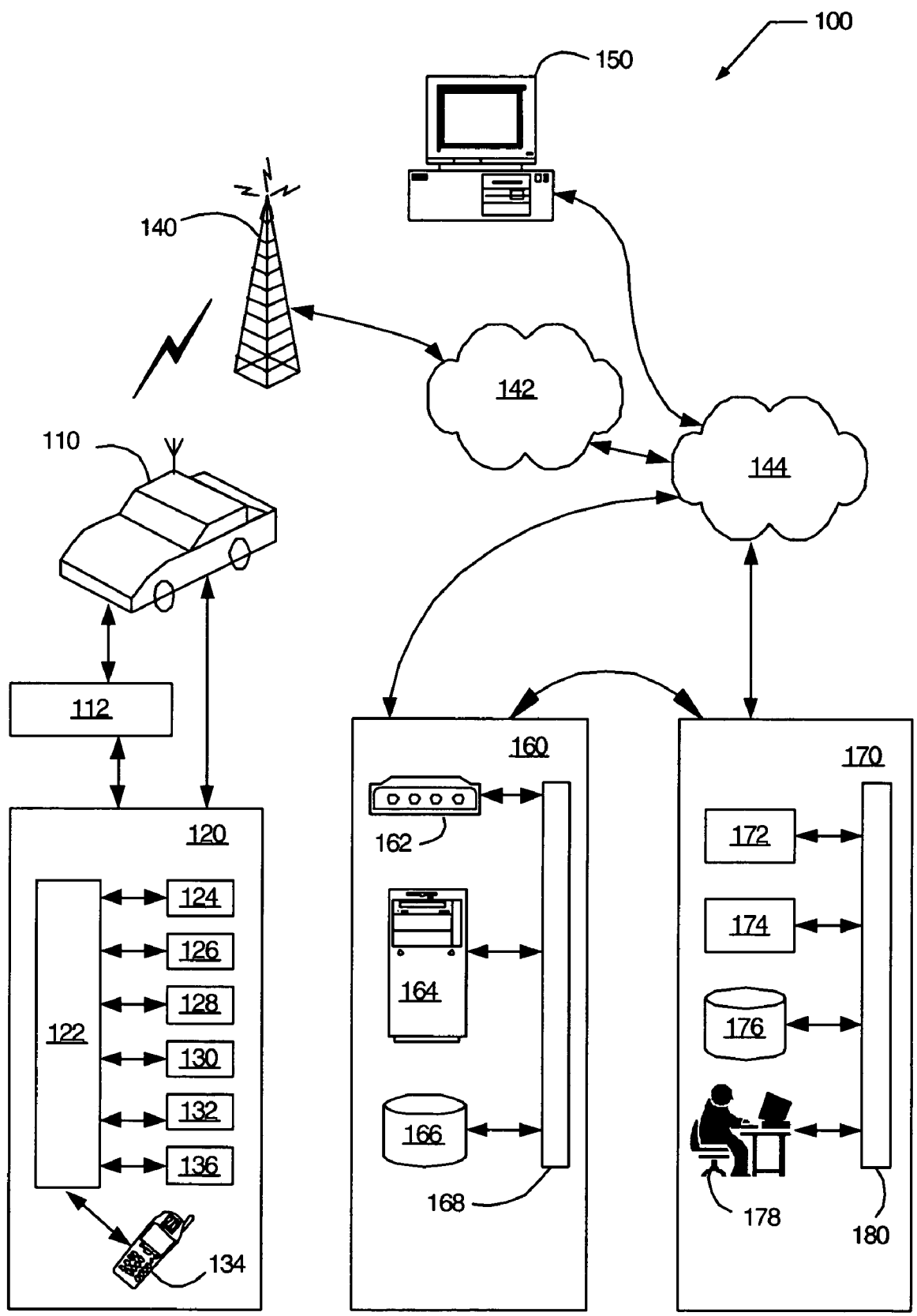
FIG. 1 illustrates one embodiment of a mobile vehicle communication system in accordance with the present invention.

FIG. 1 illustrates one embodiment of a mobile vehicle communication system (MVCS), shown generally at 100. Mobile vehicle communication system 100 includes mobile vehicle 110, vehicle communication bus 112, vehicle communications unit (VCU) 120, one or more wireless carrier systems 140, one or more communication networks 142, one or more land networks 144, one or more client, personal or user computers 150, one or more web-hosting portal 160, and one or more call centers 170. In one embodiment, mobile vehicle 110 is implemented as a mobile vehicle equipped with suitable hardware and software for transmitting and receiving voice and data communications.

In one embodiment, vehicle communications unit 120 is a telematics unit that includes a digital signal processor (DSP) 122 connected to a wireless modem 124, a global positioning system (GPS) unit 126, an in-vehicle memory 128, a microphone 130, one or more speakers 132, an embedded or in-vehicle mobile phone 134, and a wireless access point node 136. In one embodiment, DSP 122 is a microcontroller, controller, host processor, or vehicle communications processor.

In an example, DSP 122 is implemented as an application specific integrated circuit (ASIC). GPS unit 126 provides longitude and latitude coordinates of the vehicle along with the velocity magnitude and direction. In-vehicle mobile telephone system 134 is a cellular-type phone, such as, for example an analog, digital, dual-mode, dual-band, multi-mode or multi-band cellular phone. In another example, the mobile telephone system is an analog mobile telephone system operating over a prescribed band nominally at 800 MHz. The mobile telephone system is a digital mobile telephone system operating over a prescribed band nominally at 800 MHz, 900 MHz, 1900 MHz, or any suitable band capable of carrying mobile communications.

DSP 122 executes various computer programs and communication control and protocol algorithms that control communication, programming and operational modes of electronic and mechanical systems within mobile vehicle 110. In one embodiment, DSP 122 is an embedded system controller. In another embodiment, DSP 122 controls communications between telematics unit 120, wireless carrier system 140, and call center 170. In another embodiment, DSP 122 controls communications between the wireless access point node 136 and nodes of a mobile ad hoc network. DSP 122 generates and accepts digital signals transmitted between telematics unit 120 and a vehicle communication bus 112 that is connected to various electronic modules in the vehicle 110. In one embodiment, the digital signals activate the programming mode and operation modes, as well as provide for data transfers.

Mobile vehicle 110, via a vehicle communication bus 112, sends signals to various units of equipment and systems within mobile vehicle 110 to perform various functions such as unlocking a door, opening the trunk, setting personal comfort settings, and calling from telematics unit 120. In facilitating interactions among the various communication and electronic modules, vehicle communication bus 112 utilizes bus interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication bus 112 is a direct connection between connected devices.

Mobile vehicle 110, via telematics unit 120, sends and receives radio transmissions from wireless carrier system 140. Wireless carrier system 140 is implemented as any suitable system for transmitting a signal from mobile vehicle 110 to communication network 142. Wireless carrier system 140 incorporates any type of telecommunications in which electromagnetic waves carry signal over part of or the entire communication path. In one embodiment, wireless carrier system 140 transmits analog audio and/or video signals. In an example, wireless carrier system 140 transmits analog audio and/or video signals such as those sent from AM and FM radio stations and transmitters, or digital audio signals in the S band (approved for use in the U.S.) and L band (used in Europe and Canada). In one embodiment, wireless carrier system 140 is a satellite broadcast system broadcasting over a spectrum in the "S" band (2.3 GHz) that has been allocated by the U.S. Federal Communications Commission (FCC) for nationwide broadcasting of satellite-based Digital Audio Radio Service (DARS). In an example, wireless carrier system 140 is implemented as XM Satellite Radio®.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144. In one example, wireless carrier system 140 includes a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the carrier uses services compliant with other standards, such as, for example, IEEE 802.11 compliant systems and Bluetooth systems.

Land network 144 is a public-switched telephone network. In one embodiment, land network 144 is implemented as an Internet protocol (IP) network. In other embodiments, land network 144 is implemented as a wired network, an optical network, a fiber network, another wireless network, or any combination thereof. Land network 144 is connected to one or more landline telephones. Land network 144 connects communication network 142 to user computer 150, web-hosting portal 160, and call center 170. Communication network 142 and land network 144 connects wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or user computer 150 sends driver preferences to web-hosting portal through a web-page interface using communication standards such as hypertext transport protocol (HTTP), and transport-control protocol Internet protocol (TCP/IP). In one embodiment, the data includes directives to change certain programming and operational modes of electronic and mechanical systems within mobile vehicle 110. In operation, a driver utilizes user computer 150 to set or re-set user-preferences for mobile vehicle 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a bus system 168. Web-hosting portal 160 is connected directly by wire to call center 170, or connected by phone lines to land network 144, which is connected to call center 170. Web-hosting portal 160 is connected to land network 144 by one or more data modems 162. Land network 144 sends digital data to and from modem 162; data that is subsequently transferred to web server 164. In one implementation, modem 162 resides inside web server 164. Land network 144 transmits data communications between web-hosting portal 160 and call center 170.

Web server 164 receives data from user computer 150 via land network 144. In alternative embodiments, user computer 150 includes a wireless modem to send data to web-hosting portal 160 through a wireless communication network 142 and a land network 144. Data is received by modem 162 and sent to one or more web servers 164. In one embodiment, web server 164 is implemented as any suitable hardware and software capable of providing web services to transmit and receive data from user computer 150 to telematics unit 120 in mobile vehicle 110. Web server 164 sends to or receives data transmissions from one or more databases 166 via bus system 168. Web server 164 includes computer applications and files for managing vehicle data.

In one embodiment, one or more web servers 164 are networked via bus system 168 to distribute user-preference data among its network components such as database 166. In an example, database 166 is a part of or a separate computer from web server 164. Web server 164 sends data transmissions with user preferences to call center 170 via modem 162, and through land network 144.

Call center 170 is a location where many calls are received and serviced at the same time, or where many calls are sent at the same time. In one embodiment, the call center is a telematics call center, prescribing communications to and from telematics unit 120 in mobile vehicle 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more bus systems 180.

Switch 172 of call center 170 connects to land network 144. Switch 172 transmits voice or data transmissions from call center 170, and receives voice or data transmissions from telematics unit 120 in mobile vehicle 110 through wireless carrier system 140 and/or wireless access point node 136, communication network 142, and land network 144. Switch 172 receives data transmissions from, and sends data transmissions to, one or more web-hosting portals 160. Switch 172 receives data transmissions from, or sends data transmissions to, one or more communication services managers 174 via one or more bus systems 180.

Communication services manager 174 is any suitable hardware and software capable of providing communication services to telematics unit 120 in mobile vehicle 110. Communication services manager 174 sends to or receives data transmissions from one or more communication services databases 176 via bus system 180. Communication services manager 174 sends to or receives data transmissions from one or more communication services advisors 178 via bus system 180. Communication services database 176 sends to or receives data transmissions from communication services advisor 178 via bus system 180. Communication services advisor 178 receives from or sends to switch 172 voice or data transmissions.

Communication services manager 174 facilitates one or more services, such as, but not limited to, enrollment services, navigation assistance, directory assistance, roadside assistance, business or residential assistance, information services assistance, emergency assistance, and communications assistance and vehicle data management services. Communication services manager 174 receives service requests for services from a user via user computer 150, web-hosting portal 160, and land network 144. Communication services manager 174 transmits and receives user-preference and other types of vehicle data to telematics unit 120 in mobile vehicle 110 through wireless carrier system 140, communication network 142, land network 144, wireless access point node 136 voice and data switch 172, and bus system 180. Communication services manager 174 stores or retrieves vehicle data and information from communication services database 176. Communication services manager 174 provides requested information to communication services advisor 178.

In one embodiment, communication services advisor 178 is a real advisor. In another embodiment, communication services advisor 178 is implemented as a virtual advisor. In an example, a real advisor is a human being at service provider service center in verbal communication with service subscriber in mobile vehicle 110 via telematics unit 120. In another example, a virtual advisor is implemented as a synthesized voice interface responding to requests from telematics unit 120 in mobile vehicle 110.

Communication services advisor 178 provides services to telematics unit 120 in mobile vehicle 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

Mobile vehicle 110 initiates service requests to call center 170 by sending a voice or digital-signal command to telematics unit 120 which in turn, sends an instructional signal or a voice call through wireless modem 124, wireless carrier system 140, communication network 142, and land network 144 to call center 170. In another embodiment, the service request is for a vehicle data upload, as is known in the art. In another embodiment, the mobile vehicle 110 receives a request from call center 170 to send various vehicle data from mobile vehicle 110 through telematics unit 120 through wireless modem 124, wireless access point node 136, wireless carrier system 140, communication network 142, and land network 144 to call center 170.

Figure 2:
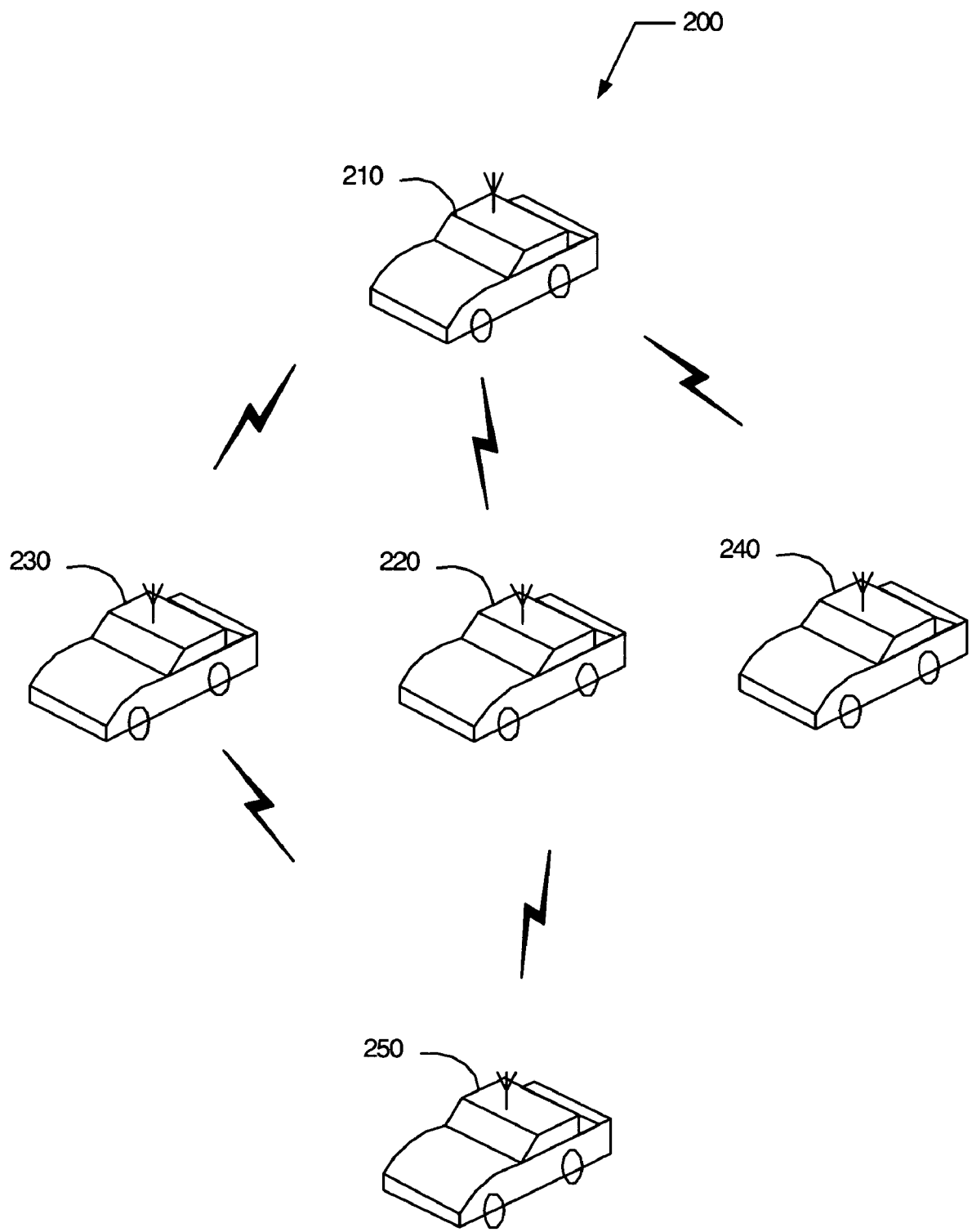
FIG. 2 illustrates a second embodiment of a mobile vehicle communication system in accordance with the present invention.

FIG. 2 is a block diagram of a second exemplary operating environment for an embodiment of the invention. FIG. 2 shows an embodiment of a wireless mobile ad hoc network 200. FIG. 2 illustrates five mobile vehicles 210, 220, 230, 240, and 250 each enabled for wireless communication through a vehicle communication unit (VCU) such as VCU 120 of FIG. 1. In one embodiment, each vehicle contains a wireless access point node such as an IEEE 802.11 compliant wireless transceiver unit, a Global Positioning System (GPS) transceiver, a digital radio unit and a cellular telephone. In another embodiment, each vehicle's VCU is registered for subscriber services from a telematics service provider.

In operation, the vehicles 210, 220, 230, 240, and 250 are mobile and change locations relative to one-another as each vehicle navigates roads and highways. In one embodiment, each vehicle of mobile ad hoc network 200 is capable of sending messages to, and receiving messages from, an IEEE 802.11 compliant device. In another embodiment, a different multiple access control layer (MAC) than the IEEE 802.11 standard is implemented for a wireless mobile ad hoc network 200. In a wireless mobile ad hoc network, all wireless access point devices within the radio range of a source node constitute the set of neighbors, or neighbor nodes, of that source node.

In FIG. 2 each vehicle is a node of the wireless ad hoc network 200. In one embodiment, a stationary wireless device (not shown) is a neighbor node as long as at least one of the ad hoc network vehicles is in radio contact with the stationary node. Each neighbor node has access to transmissions from every other node in the network, either directly from unit to unit, or indirectly through hops to intermediate neighbor nodes. In FIG. 2 for example, vehicle 210 is shown in radio communication with vehicle 220. Vehicle 220 is further shown in communication with vehicle 250. Vehicle 240 is shown in communication with vehicle 210. Therefore, vehicle 240 is enabled to communicate with vehicle 250 through vehicle 210, since vehicle 250 is enabled to communicate with vehicle 210 through vehicle 220.

The ability to communicate through intermediate neighbor nodes in a mobile ad hoc network allows for much greater physical distance between nodes in the network while still providing all nodes access to the network. The routing of messages over multi-hop routes in the mobile ad hoc network 200 depends upon the resources of each node in the network. In a mobile vehicle environment, for example, system resources often do not allow the luxury of supporting very large routing tables accommodating information about all routes or nodes within the network. Such a node table requires extensive storage overhead in the form of random access memory, which is typically at a premium in the embedded systems found in a vehicle. However, if the tables store information about neighbor nodes (e.g. up to certain number of hops away), then vehicle system resources become less critical as the overhead storage is reduced. The judicious selection of neighboring vehicles (border nodes) as repeaters to carry messages obviates the need to send the messages to every node within the network. The number of vehicles and potential nodes within the radio range of the source node will depend on traffic density and number of subscribers.

There are many practical applications for mobile wireless ad hoc networks 200 in the inter-vehicle communication environment One embodiment includes estimating the amount of traffic and its rate of flow in a given geographical area. In another embodiment, the mobile wireless ad hoc network 200 is used to retrieve information from a service provider. In a further embodiment, the mobile vehicle ad hoc network 200 is implemented to extend the coverage of a cellular infrastructure through an ad hoc network formed of vehicles which cooperate in forwarding their respective requests to the cellular base station. In yet another embodiment, vehicles following one another collaborate as a caravan sharing an expedition map or itinerary. In still another embodiment, a stationary node monitoring a parking lot provides available parking space information or instant coupons redeemable at their store. Another embodiment includes enabling drivers to chat in a teleconference-like environment (using, for example, Voice over IP) with other nearby drivers that share similar interests. In particular, it is envisioned that car-to-car mobile ad hoc networks serve two important purposes: first, they complement the existing cellular system in hot spots where the system gets overloaded and it is better for cars to assist each other in reaching the base station rather than competing for the same base station. Second, they extend the coverage range of the cellular-based subscription service infrastructure.

One method to select an intermediate neighbor node to re-broadcast information within a mobile vehicle ad hoc network is to include an identifier in the message for the specific node. In this manner, a message is widely broadcast but ignored by all but the selected identified node. First, the source node requires information about the neighboring nodes within its radio range. This is information is attained utilizing "hello" packets or periodic beacons as will be known to the skilled practitioner. Neighbor node information includes, but is not limited to, the unique address or identification (ID) of each responding node.

In accordance with an embodiment of the invention, a selective flooding algorithm invokes a border node broadcast protocol to select border nodes for information dissemination and to obtain information about other nodes. In one embodiment, the algorithm is represented by the following pseudo-code:

Border_Broadcast(vehicle i)
{
1. Vehicle 'i' sends a message requesting position information of its neighbors.
2. For (j=1; j≦# neighbors(i); j++) Vehicle 'j' replies by sending [pos(j)] to vehicle 'i'.
3. Vehicle 'i' selects a number 'B' of border neighbors for re-broadcasting its message.
4. For each message x that 'i' wishes to broadcast or rebroadcast, vehicle 'i' broadcasts the message to its neighbors along with the IDs of the elected border vehicles.
5. For (j=1; j≦# neighbors(i); j++)
   If (j={IDs of Border Vehicles})
      Border_Broadcast(j)
}

The preceding pseudo-code is applicable for disseminating various information such as route request (RR) messages generated by an on-demand routing protocol, and location information such as GPS data that describes where nodes are in the geographical area covered by the network.

In another embodiment the above pseudo-code algorithm is periodically invoked for all nodes in the network, in a round-robin fashion, in order to implement a proactive border node dissemination protocol (where each node takes a turn in disseminating its information) through a process represented by following pseudo-code:

main()
{
For (i=1; i<# vehicles; i++)
   Border_Broadcast(i)
}

Furthermore, message "x" carries the position information of each vehicle. Thus, for position-based routing algorithms, huge tables must be stored onboard each vehicle, which is impractical in the embedded systems environment.

In an on-demand type implementation, the Border_Broadcast(i) algorithm is invoked whenever a source vehicle (node) wishes to locate or establish a communication route to a destination vehicle (node). In this case, message "x" contains a query about the destination information, which alleviates the requirement to store large neighbor node tables. If message "x" contains the RR message then this algorithm would be directly applicable to the route discovery phase in on-demand routing protocols (e.g. AODV and DSR).

For position-based routing protocol implementations, the on-demand information dissemination approach described above involves two phases (once the destination is found, it sends its information back to the source). This is done via the route established in the broadcast phase from source to destination (exactly like the route discovery phase in on-demand routing protocols).

In another embodiment, a hybrid information dissemination protocol includes invoking the proactive border node dissemination algorithm up to a predetermined number of hops away from the source. Beyond the predetermined number of hops, the on-demand border node algorithm is invoked. When a source vehicle (node) requires the location information of a destination vehicle (node), it searches in its neighbor node table (created by the proactive border vehicle broadcast). If the destination is not found, the on-demand border vehicle broadcast algorithm is activated. In one embodiment, the number of hops allowed before switching to an on-demand border node dissemination protocol is selectable depending on dynamic network parameters such as the number of neighbor nodes. In another embodiment the number of hops allowed before switching to an on-demand border node dissemination protocol is between two and ten hops and preferably less than five hops. In one embodiment, each intermediate "hop" node (border node) between the source and the destination is treated as a source node to the destination, and a broadcast protocol is established for broadcasting information from the "hop" node.

Another important element of selective flooding border node selection is a geometric rule to provide even coverage within the ad hoc network.

Figure 3:
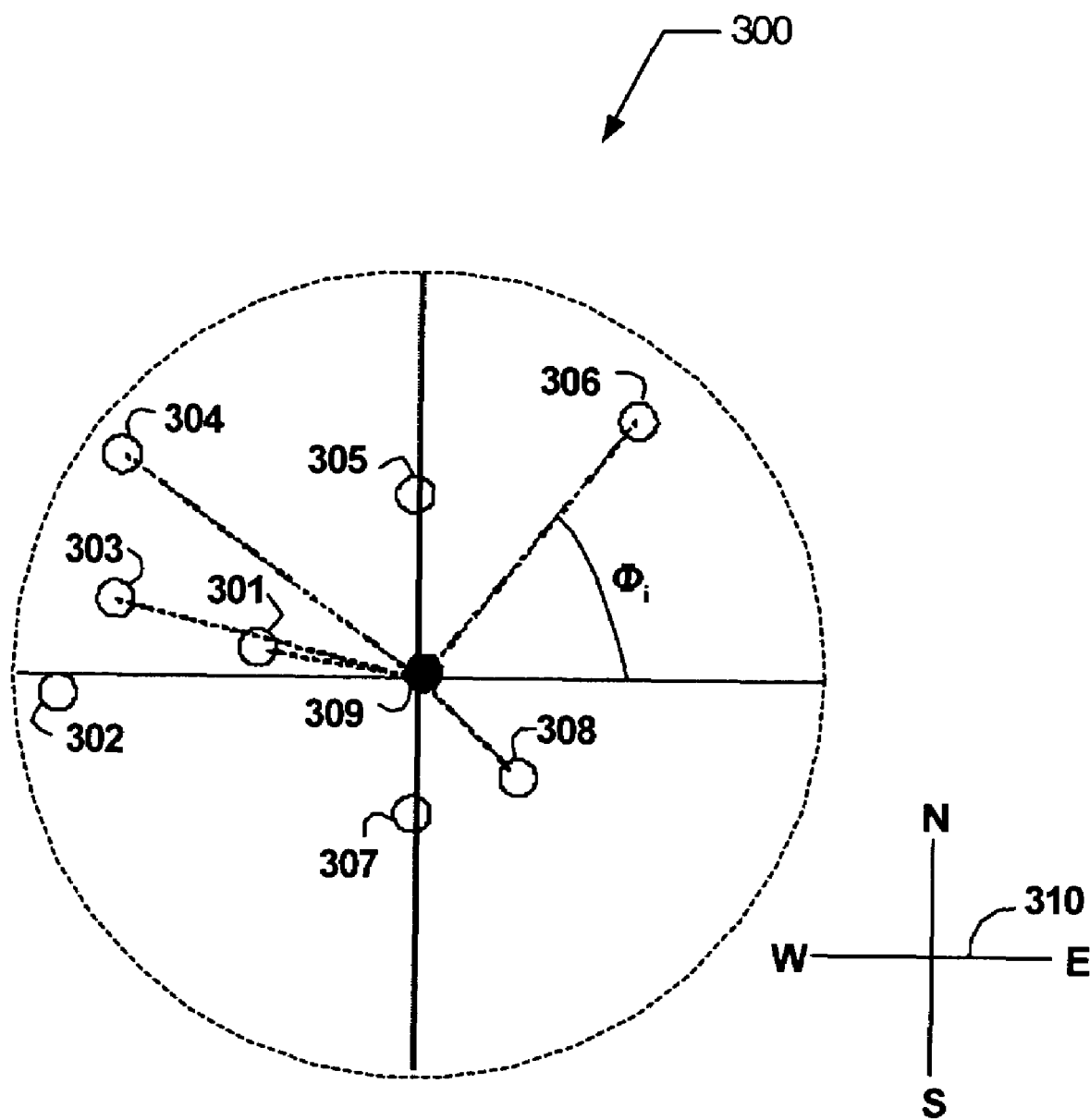
FIG. 3 illustrates geometric selection criteria for determining mobile ad hoc network border nodes in accordance with the present invention.

FIG. 3 illustrates geometric selection criteria for determining mobile ad hoc network border nodes in accordance with the present invention. FIG. 3 shows a diagram of a source node neighborhood 300 comprising nine wireless nodes 301, 302, 303, 304, 305, 306, 307, 308, 309 including a source node 309 and a compass directional indicator 310. The number of border node vehicles selected is a design parameter that can be varied to trade efficiency for performance. It is given by:

$$B = f*N, \quad (1)$$

where N=number of neighbors and f is a fraction 0.1, 0.2, . . . , 1.

The case of f=1 is a plain flooding algorithm where all neighbors re-broadcast the sender's message. In one embodiment, border node vehicles are selected based upon determining the farthest neighboring nodes closest to the compass points of North, South, East and West directions, guaranteeing maximum coverage by the dissemination algorithm for any arbitrary road map. For the special case of a single road, at least one border vehicle is selected along the forward and reverse directions of the road.

The directions of various neighbor nodes relative to the sender are computed from the neighboring node's coordinates, assuming the reference direction is EAST. The angular position ($\phi$) of each neighbor node is determined relative to the source node (sender) starting from the reference axis. Neighbor nodes are classified according to the following geometric rules:

Farthest vehicle closest to EAST direction should satisfy:

$$\max. d_i \cos|\phi_i| \quad (2)$$

Farthest vehicle closest to NORTH direction should satisfy:

$$\max. d_i \cos|\phi_i - 90°| \quad (3)$$

Farthest vehicle closest to WEST direction should satisfy:

$$\max. d_i \cos|\phi_i - 180°| \quad (4)$$

Farthest vehicle closest to SOUTH direction should satisfy:

$$\max. d_i \cos|\phi_i - 270°| \quad (5)$$

where $d_i$=distance between sender 309 and the neighboring node "i".

For the example shown in FIG. 3, assuming B=4, the source node 309 running the border selection algorithm would designate the following as border vehicles and would include their IDs in the broadcast message:
Vehicle closest to East is 306
Vehicle closest to North is 306
Vehicle closest to West is 302
Vehicle closest to South is 307

In one embodiment, more than one border vehicle in each compass point direction is selected depending on the parameter "B," in order to increase the reachability of the dissemination algorithm, which is defined as the percentage of attempts that a vehicle is located successfully. In another embodiment, eight border nodes are selected. In yet another embodiment, at least two nodes are selected for each quadrant.

Figure 4:
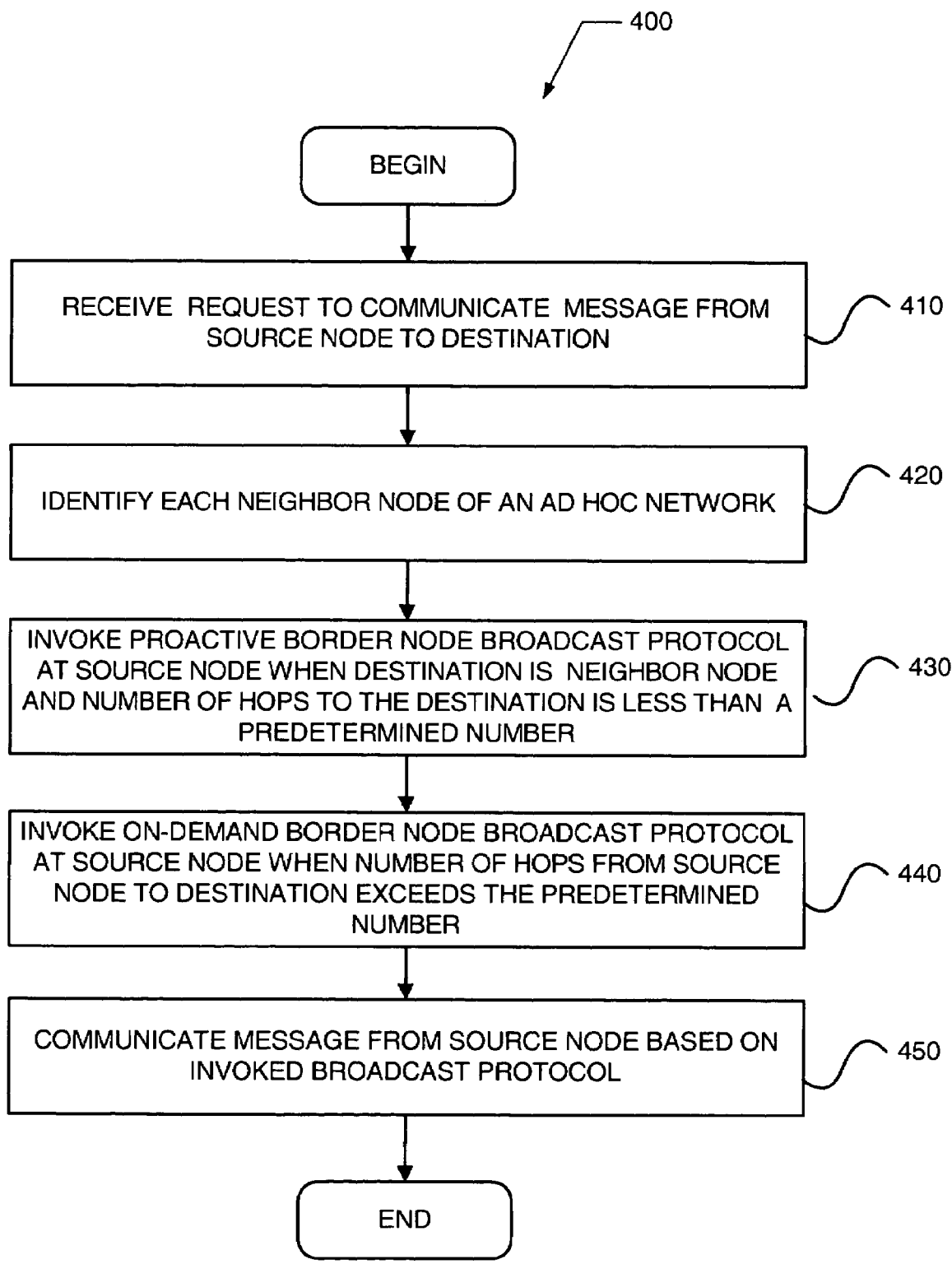
FIG. 4 is a flow diagram of a method for information dissemination in a wireless mobile ad hoc network in accordance with an embodiment of the invention.

FIG. 4 is a flow diagram of a method 400 for information dissemination in a wireless mobile ad hoc network in accordance with an embodiment of the invention. Method 400 begins in step 410. In one embodiment, a computer readable medium storing a computer program is enabled to implement one or more steps of method 400 when the computer program is executed by a processor.

In step 410, a request to communicate information from a source node to a destination is received. In one embodiment, receiving a request to communicate information includes originating a new message from within the source node or a telematics device connected to the source node. In another embodiment, receiving a request to communicate information includes receiving an information request from another node in a mobile ad hoc network.

In step 420, each neighbor node of an ad hoc network is identified. Step 420 may occur at any time after a request to communicate information has been received. In an embodiment, identifying each neighbor comprises polling each neighbor node for position information, receiving position information from each neighbor node responsive to the poll, and generating a neighbor node table identifying the location of each neighbor node.

In step 430, a proactive border node broadcast protocol is invoked at a source node when the information destination is a neighbor node and when the number of hops to the destination is less than a predetermined number of hops. In an embodiment, a computer readable medium stores a computer program having computer readable code for invoking a proactive border node broadcast protocol at the source node when the message destination is a neighbor node and when the number of hops to the destination is less than a predetermined number of hops. In another embodiment, an algorithm for selective border node flooding selects border nodes for information dissemination and obtains information about neighbor nodes within radio range of the source node in a process represented by the pseudo-code discussed with reference to FIG. 2 and FIG. 3.

In step 440, an on-demand broadcast protocol is invoked at the source node when the number of hops from the source node to the destination exceeds the predetermined number. Step 440 may occur at any time after a request to communicate information has been received. In an embodiment, a computer readable medium stores a computer program having computer readable code for invoking an on-demand border node broadcast protocol at the source node when the number of hops from the source node to the destination exceeds the predetermined number. In another embodiment, an algorithm for selective flooding selects border nodes for information dissemination and obtains information about neighbor nodes within radio range of the source node in a process represented by the pseudo-code discussed with reference to FIG. 2 and FIG. 3.

In step 450, information is communicated from the source node based on the invoked broadcast protocol. In an embodiment, communicating the information based on the border node broadcast protocol comprises selecting at least one neighbor node as a border node based on a geographic location of the neighbor node and geometric criteria and broadcasting the information from the source node where the information that is broadcast from the source node identifies each selected one border node to act as a "hop" node and a communication destination.

In one embodiment, communicating the information based on the border node broadcast protocol further comprises receiving the broadcast information at the selected border node, invoking a border node broadcast protocol at the border node and rebroadcasting the received information from the border node to the destination based on the invoked border node broadcast protocol.

In yet another embodiment, the predetermined number of hops is selectable. In still another embodiment, selecting at least one neighbor node as a border node based on a geographic location of the neighbor node and geometric criteria comprises determining at least one neighbor node having both a maximum distance from the source node and a minimum distance to one of the compass point directions North, South, East and West. In an embodiment, at least one border node is selected for each compass point direction North, South, East and West.

In another embodiment, communicating the message based on the on-demand border node broadcast protocol comprises generating a destination query message, selecting a neighbor node as a border node based on a geographic location of the neighbor node and geometric criteria, and broadcasting from the source node where the message identifies each selected border node and the destination query message.

In yet another embodiment, the query message is a route request in the class of on-demand routing protocols (e.g. AODV and DSR). In still another embodiment, selecting a border node based on a geographic location of the neighbor node and geometric criteria includes determining at least one neighbor node having both a maximum distance from the source node and a minimum distance to one of the compass point directions North, South, East and West. In yet another embodiment, at least one border node is selected for each compass point direction North, South, East and West. Method 400 terminates when a message has been communicated according to an invoked border node broadcast protocol.

It is anticipated that the invention will be embodied in other specific forms not described that do not depart from its spirit or essential characteristics. The described embodiments are to be considered in all respects only as illustrative and not restrictive.

We claim:

1. A method for information dissemination in a wireless mobile ad hoc network comprising:
    receiving a request to communicate information from a source node to a destination;
    identifying each neighbor node of the source node in the ad hoc network;
    invoking a proactive border node broadcast protocol at the source node when the destination is a neighbor node and wherein the number of hops to the destination is less than a predetermined number of hops;
    invoking an on-demand border node broadcast protocol at the source node when the number of hops from the source node to the destination exceeds the predetermined number; and
    communicating the information from the source node based on the invoked broadcast protocol by:
        selecting at least one neighbor node as a border node based on a geographic location of the neighbor node and geometric criteria by determining at least one neighbor node having both a maximum distance from the source node and a minimum distance to a one of the compass point directions North, South East and West; and
        broadcasting the information from the source node, wherein the broadcast information identifies the selected at least one border node and a communication destination.

2. The method of claim 1 wherein identifying each neighbor node comprises:
    polling each neighbor node for position information;
    receiving position information from each neighbor node responsive to the poll; and
    generating a neighbor node table identifying the location of each neighbor node.

3. The method of claim 1 further comprising:
    receiving the broadcast information at the selected border node;
    invoking a border node broadcast protocol at the border node; and
    rebroadcasting the received information from the border node to the destination based on the invoked border node broadcast protocol.

4. The method of claim 1 wherein the predetermined number of hops is selectable.

5. The method of claim 1 wherein at least one border node is selected for each compass point direction North, South, East and West.

6. A method for information dissemination in a wireless mobile ad hoc network comprising:
    receiving a request to communicate information from a source node to a destination;
    identifying each neighbor node of the source node in the ad hoc network;
    invoking an on-demand border node broadcast protocol at the source node after determining that the number of hops from the source node to the destination exceeds the predetermined number; and
    communicating the information from the source node based on the invoked broadcast protocol, wherein communicating the information comprises:
    generating a destination query message;
    selecting at least one neighbor node as a border node based on a geographic location of the neighbor node and geometric criteria by determining at least one neighbor node having both a maximum distance from the source node and a minimum distance to a one of the compass point directions North, South, East and West;
    broadcasting the information from the source node;
    wherein the information identifies the at least one selected neighbor node and the destination query message.

7. The method of claim 6 wherein the destination query message is a route request message for on-demand topology-based routing protocols.

8. The method of claim 6 wherein at least one border node is selected for each compass point direction North, South, East and West.

9. A computer readable medium storing a computer program comprising:
    computer readable code for determining a request to communicate information between a source node and a destination;
    computer readable code for identifying each neighbor node of the source node in the ad hoc network;
    computer readable code for selecting at least one border node by determining at least one neighbor node having both a maximum distance from the source node and a minimum distance to one of the compass point directions North, South, East and West;
    computer readable code for invoking a proactive border node broadcast protocol at the source node when the destination is a neighbor node and wherein the number of hops to the destination is less than a predetermined number of hops;

computer readable code for invoking an on-demand border node broadcast protocol at the source node when the number of hops from the source node to the destination exceeds the predetermined number; and computer readable code for directing the communication of the message from the source node based on the invoked broadcast protocol.

10. The computer readable medium of claim 9 wherein computer readable code for identifying each neighbor node of an ad hoc network comprises:

computer readable code for polling the local zone for position information for each neighbor node; and, computer readable code for generating a neighbor node table identifying the location of each neighbor from position data received from each neighbor node responsive to the poll.

11. The computer readable code of claim 9 wherein code for directing the communication of information from the source node based on the border node broadcast protocol comprises:

computer readable code for selecting at least one neighbor node as a border node based on a geographic location of the neighbor node and geometric criteria;

computer readable code instructing the information to be broadcast from the source node; and wherein the information identifies the selected at least one border node and a communication destination.

12. The computer readable medium of claim 11 further comprising:

computer readable code for receiving the broadcast information at the selected border node;

computer readable code for invoking a border node broadcast protocol at the border node; and computer readable code for rebroadcasting the received information from the border node to the destination based on the invoked border node broadcast protocol.

13. A computer readable medium storing a computer program comprising:

computer readable code for determining a request to communicate information between a source node and a destination;

computer readable code for identifying each neighbor node of the source node in the ad hoc network;

computer readable code for selecting at least one border node by determining at least one neighbor node having both a maximum distance from the source node and a minimum distance to a one of the compass point directions North, South, East and West;

computer readable code for invoking an on-demand border node broadcast protocol at the source node when the number of hops from the source node to the destination exceeds the predetermined number, including computer readable code for generating a destination query message;

computer readable code for selecting at least one neighbor node as a border node based on a geographic location of the neighbor node and geometric criteria; and computer readable code instructing the information to be broadcast from the source node wherein the information identifies the at least one selected neighbor node and the destination query message; and computer readable code for directing the communication of the message from the source node based on the invoked broadcast protocol.

14. The computer readable medium of claim 13 further comprising code for selecting at least one border node for each compass point direction North, South, East and West.

* * * * *